UNITED STATES PATENT OFFICE.

FRANCES DELORD HALL, OF PLATTSBURG, NEW YORK.

OINTMENT.

SPECIFICATION forming part of Letters Patent No. 439,581, dated October 28, 1890.

Application filed August 19, 1890. Serial No. 362,446. (No specimens.)

*To all whom it may concern:*

Be it known that I, FRANCES DELORD HALL, a citizen of the United States, residing at Plattsburg, in the county of Clinton and State of New York, have invented a new and useful Composition of Matter or Ointment, of which the following is a specification.

This ointment, the efficacy of which has been positively proved in numerous cases, is a healing antiseptic and curative ointment to be used for exema, fever-sores, catarrh, salt-rheum, hemorrhoids, sore nipples, burns, blisters, scratches, corns, sore eyes, chapped hands and lips, as an antiseptic dressing for wounds and excoriated surfaces, and as a relief from sunburn.

My composition consists of the following ingredients, combined in the proportions stated, viz: Sweet oil of almonds, twenty-four ounces; white wax, four ounces; spermaceti, four ounces; sub-nitrate of bismuth, two ounces; glycerine, two ounces, and carbolic acid crystals, seven drams, tannic acid being added for bleeding hemorrhoids in the proportion of one part, by weight, of tannic acid to ten parts, by weight, of the ointment. These ingredients, with the exception of the carbolic acid, are put into an earthen receptacle, which is immersed in a kettle of hot water, the mixture being well stirred until thoroughly liquefied. Then the receptacle is taken from the hot water and the carbolic acid dissolved and added to the mixture while hot. The whole is to be thoroughly beaten with a silver spoon, the portions solidifying on the sides of the earthen receptacle being mixed again with the liquid portions until the entire mass assumes the consistency and color of thick cream, when it may be put up in boxes or jars.

What I claim, and desire to secure by Letters Patent of the United States, is—

The herein-described composition of matter or ointment, consisting of sweet oil of almonds, white wax, spermaceti, sub-nitrate of bismuth, glycerine, and carbolic acid, in the proportions specified.

FRANCES DELORD HALL.

Witnesses:
SARAH WOOL MOORE,
CATHERINE DOWLING.